May 23, 1950     F. F. BORKMANN     2,508,368
CONVEYER MECHANISM FOR UPENDING ARTICLES
Filed May 14, 1947     2 Sheets-Sheet 1

INVENTOR
Frank F. Borkmann
BY
ATTORNEYS

May 23, 1950   F. F. BORKMANN   2,508,368
CONVEYER MECHANISM FOR UPENDING ARTICLES
Filed May 14, 1947   2 Sheets-Sheet 2
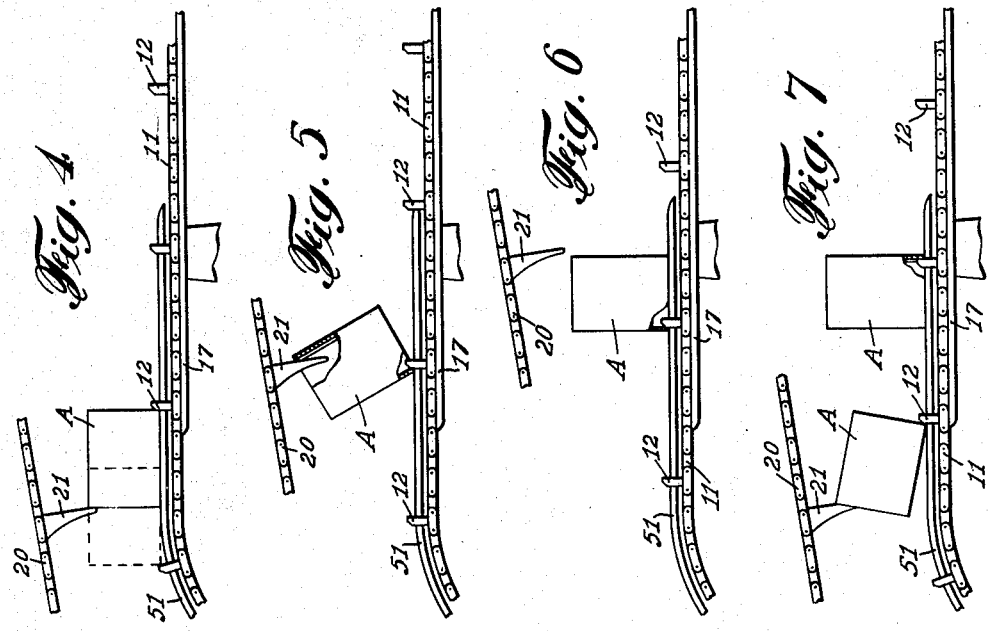
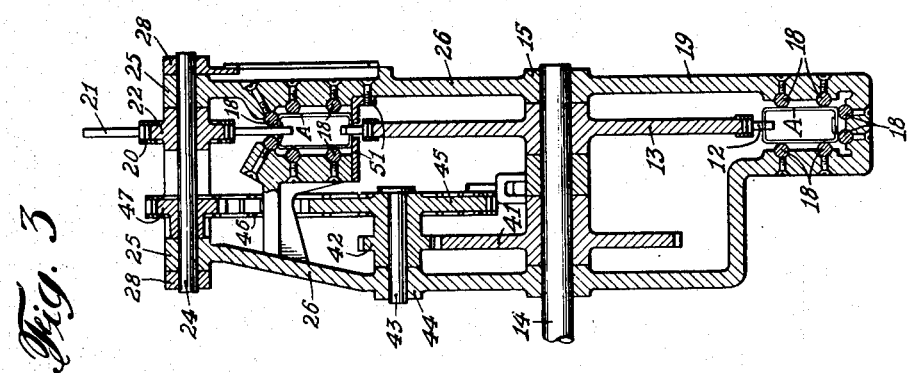
INVENTOR
Frank F. Borkmann
BY
ATTORNEYS Patented May 23, 1950

2,508,368

UNITED STATES PATENT OFFICE 2,508,368

CONVEYER MECHANISM FOR UPENDING ARTICLES

Frank F. Borkmann, Union, N. J., assignor to American Can Company, New York, N. Y., a corporation of New Jersey Application May 14, 1947, Serial No. 748,088

10 Claims. (Cl. 198—33)

1

The present invention relates to a conveyor mechanism for articles such as container or can bodies and has particular reference to devices for upending or uprighting the bodies as they move along a predetermined path of travel.

In the manufacture of certain kinds of containers, such as fibre containers for frozen foods and other products, the bodies preferably are coated interiorly and exteriorly by carrying them on a conveyor through a bath of molten paraffine or other suitable coating material. For such an operation the bodies preferably are carried in a continuous procession in endwise relation so that the coating material can best pass through and cover all surfaces of the bodies. After such a coating operation the bodies are upended on the conveyor to permit excess coating material to drain off.

The instant invention contemplates devices for upending the bodies for such a draining operation as they move with the conveyor.

An object of the invention is the provision in a conveyor mechanism for carrying container bodies in a continuous procession, of upending or uprighting devices wherein each body as it comes adjacent the upending devices is turned upwardly through an angle of substantially ninety degrees for setting bodies rapidly and smoothly on their ends, as they travel in a continuous procession with the conveyor for a subsequent operation.

Another object is the provision of such a conveyor mechanism wherein the bodies being upended are maintained in a predetermined timed relation with each other so that they will be in proper order for further processional advancement and treatment.

Another object is the provision of such a conveyor mechanism wherein the upending of the bodies is effected gently and gradually while traveling at high speed and in such a manner that damage to the bodies is eliminated, while facilitating handling of the bodies at high speed rates of production.

Numerous other objects and advantages of the invention will be apparent as it is better understood from the following description, which, taken in connection with the accompanying drawings, discloses a preferred embodiment thereof.

Referring to the drawings:

Fig. 3 is a sectional view taken substantially along the broken line 3—3 in Fig. 2; and Figs. 4, 5, 6 and 7 are schematic views showing how a container body is upended.

2

Figures 1, 2:
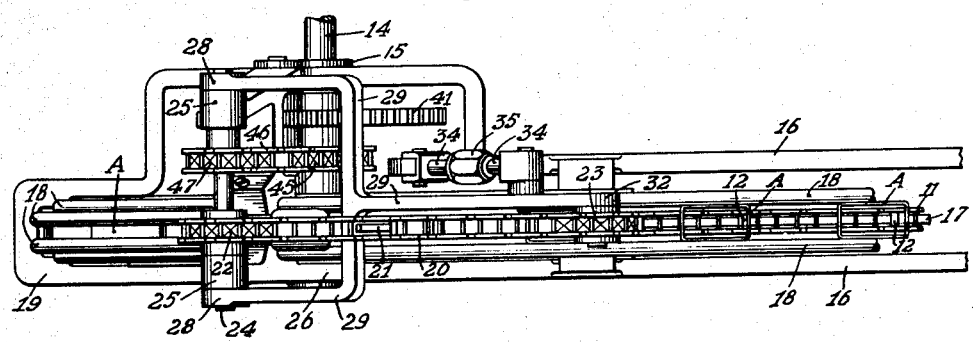
Figure 1 is a plan view of a conveyor mechanism embodying the instant invention, with parts broken away.
Fig. 2 is a side view of the mechanism shown in Fig. 1, with parts broken away.

As a preferred embodiment of the invention the drawings illustrate principal parts of a conveyor mechanism and a cooperating upending device for turning horizontally disposed container bodies A (Fig. 2) up onto one end while maintaining them in timed relation as they move along a predetermined path of travel. By way of example, the bodies being operated upon are paraffine coated fibre bodies of rectangular cross-section of the type used for frozen foods and have both ends open.

In the mechanism, the freshly coated bodies A are propelled along a path of travel in a continuous procession in endwise relation and in spaced timed order by an endless chain feeding conveyor 11 (Figs. 1 and 2) having spaced feed dogs 12 secured thereto at spaced intervals for propelling engagement with the rear edges of the bodies. The chain conveyor 11 operates over a sprocket 13 (see also Fig. 3) mounted on a horizontal shaft 14 journaled in bearings 15 formed in a frame 16 which may be the main frame of a more elaborate machine of which the conveyor mechanism forms a part. The shaft 14 is driven continuously in any suitable manner. The upper run of the conveyor rides over a longitudinal support rail 17 mounted on brackets secured to the frame 16 for supporting the conveyor against sagging.

The container bodies A as they travel with the conveyor 11 along its lower run are disposed in a horizontal position and are supported and guided by a plurality of guide rails 18 which extend adjacent the path of travel of the conveyor. These guide rails are secured to arms 19 which extend outwardly from the frame 16. Adjacent the end of the conveyor the guide rails curve around the sprocket 13 and thus guide the bodies upwardly onto the upper run of the conveyor. The rails continue along this upper run of the conveyor for continued guidance of the bodies.

Upending or uprighting of the bodies A is effected immediately upon their entrance onto the upper run of the conveyor 11 for the purpose of permitting excess coating material to drain away from the freshly coated bodies. This upending operation is brought about by an upending device B which is disposed above and adjacent the path of travel of the bodies on the conveyor 11.

The upending device B includes an endless upending chain or conveyor 20 which is disposed at a slight angle to the feeding conveyor 11 as best shown in Fig. 2 and which carries a plurality of upending fingers 21 secured thereto at spaced intervals. This upending chain is carried on a pair of spaced sprockets constituting a driving sprocket 22 and an idler sprocket 23. The driving sprocket 22 is mounted on a driven shaft 24 journaled in a pair of spaced bearings 25 (Fig. 3) formed on the upper ends of a pair of arms 26 which extend up from the frame 16 adjacent the feeding conveyor sprocket 13.

The ends of the drive shaft 24 project beyond the bearings 25 and extend through a pair of spaced bearings 28 of a bracket or subframe 29. The outer ends of the shaft 24 thus serve as trunnions for the subframe and provide a pivotal mounting for the frame.

The idler sprocket 23 of the upending chain 20 is mounted on a shaft 31 journaled in a bearing 32 formed in the free end of the subframe 29. This end of the subframe may be adjusted to accommodate the chain 20 to bodies of different heights. For this purpose this end of the subframe is held in place by a two piece link 34 having a connecting turnbuckle 35. One piece of the link is pivotally secured to the subframe 29 adjacent the idler sprocket 23 while the opposite piece of the link is pivotally secured to the frame 16. Hence by merely turning the turnbuckle the free end of the upending chain 20 may be raised or lowered in accordance with the height of the bodies to be upended on the feeding conveyor 11.

Provision is made for accurately locating the free end of the upending chain 20 for different heights of bodies. For this purpose the pivoted end of the subframe 29 carries an indicating pointer 37 which extends down adjacent one of the support arms 26 and terminates adjacent a graduated scale 38 mounted on the arm. The pointer moves with the subframe and thus indicates on the scale the angular position of the chain.

The upending chain 20 through its driving sprocket 22 and its drive shaft 24 is continuously operated in time with the feeding conveyor 11 and travels somewhat faster than the feeding conveyor. This is brought about by a driving gear 41 (Fig. 3) which is mounted on the feeding conveyor drive shaft 14 and is continuously rotated by this shaft. The gear meshes with and rotates a pinion 42 mounted on a subshaft 43 carried in a boss 44 formed in one of the support arms 26. The pinion is formed integrally with a sprocket 45 which drives an endless chain 46 which operates over a sprocket 47 mounted on the drive shaft 24. It is through this gear and sprocket train that the upending chain 20 is continuously driven.

In operation, a container body A as it is propelled upwardly around the feeding conveyor sprocket 13, by a feed dog 12 of the feeding conveyor 11, rides up onto a smooth top two piece table 51 which curves upwardly around the sprocket 13 and extends for a short distance along the upper run of the conveyor. The top surface of table is disposed above the links of the feeding conveyor and thus retains the body free of the links but in contact with its feed dog as shown in Fig. 2 and in dotted lines in Fig. 4.

As soon as a body A reaches the upper run of the feeding conveyor 11 an upending finger 21 of the upending chain 20 sweeps down around the chain driving sprocket 22 and engages the upper edge of the body adjacent the end having its lower edge in engagement with a feed dog 12. The finger 21 travels faster than the feed dog 12 and hence pushes the body away from its feed dog and advances it in the direction of travel of the feed conveyor until its forward lower edge engages against the next forward dog 12 as best shown in Fig. 4.

While the body is thus in engagement with the advanced feed dog 12 and is traveling forward with the dog, the upending finger is traveling at a faster rate of speed along the lower, inclined run of the upending chain 20 and this causes the finger to pivot the body on the advanced feed dog and thus raise or swing the body through an angle of ninety degrees into a vertical upended position. Fig. 5 shows the body being swung into this position.

This upending of the body brings it into an untimed relation with the feed dogs 12 on the feeding conveyor, with the advanced feed dog located inside the body as shown in Fig. 6. The retiming of the body with its dog is the function of the table 51. This retiming is brought about by the table, holding the body elevated above its feeding conveyor 11. The body thus remains stationary in its upended position while the upending finger 21 moves up out of and free of the open top end of the body, thus leaving the body unattached except for the table 51.

During this period the advanced feed dog 12 within the body moves forward with the conveyor 11, the body remaining stationary until the dog engages against the inner surface of the body adjacent its forward or leading side as best shown in Fig. 7. The upended body is now in timed relation with the dog and in properly spaced relation with adjacent bodies on the conveyor and in this relation is picked up by the dog and carried off the discharge end of the table 15. Removal of the body from the table permits the body to rest on the feed chain and in this position it is carried along in its upright or upended relation for draining of its excess coating material and for conveyance to any suitable place of deposit.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a conveyor mechanism for articles such as container bodies and the like, the combination of a feeding conveyor, spaced feed dogs carried on said conveyor respectively for propelling a container body in endwise relation along a predetermined path of travel, and means adjacent the path of travel of said conveyor and movable relative to said conveyor for engaging and moving a container body propelled by a said dog into engagement with a preceding dog to turn the body about said last mentioned dog as a fulcrum into an upended position on said conveyor.

2. In a conveyor mechanism for articles such as container bodies and the like, the combination of a feeding conveyor, a plurality of feed dogs carried on said conveyor in spaced relation for propelling container bodies in endwise relation and in a continuous procession along a predetermined path of travel, and relatively movable means disposed adjacent and at an angle to said conveyor for engaging a container body propelled by one of said dogs and turning said body about another of said dogs as a fulcrum into upright position on said conveyor.

3. In a conveyor mechanism for articles such as container bodies and the like, the combination of a feeding conveyor, a plurality of feed dogs carried on said conveyor in spaced relation for propelling container bodies in endwise relation and in a continuous procession along a predetermined path of travel, means movable adjacent the path of travel of said conveyor for engaging a moving container body adjacent an end thereof, said means shifting said body along said conveyor away from its propelling dog and into engagement with the preceding dog to pivotally turn said body into an upended position by utilizing said preceding dog as a fulcrum point, and restraining means for holding the upended body against advancement with said conveyor until properly engaged by said preceding dog for maintaining the body in timed relation on said conveyor.

4. In a conveyor mechanism for articles such as container bodies and the like, the combination of a feeding conveyor, a plurality of feed dogs carried on said conveyor in spaced relation for propelling container bodies in endwise relation and in a continuous procession along a predetermined path of travel, an endless chain upending conveyor disposed adjacent the path of travel of said feeding conveyor, actuating means for moving said upending conveyor in time with said feeding conveyor, and an upending finger carried on said upending conveyor and engageable with the end of a moving body propelled by one of said dogs and pivoting the body on its opposite end about another of said dogs as a fulcrum into an upright position on said conveyor.

5. In a conveyor mechanism for articles such as container bodies and the like, the combination of a feeding conveyor having a plurality of feed dogs carried in spaced relation thereon for propelling container bodies in endwise relation and in a continuous procession along a predetermined path of travel, an endless chain upending conveyor disposed adjacent the path of travel of said feeding conveyor, actuating means for moving said upending conveyor in time with said feeding conveyor, and a plurality of upending fingers carried on said upending conveyor respectively engageable with the trailing ends of containers propelled by said dogs for pivoting the containers in timed order about conveyor dogs in advance of said propelling dogs into an upright position on said conveyor.

6. In a conveyor mechanism for articles such as container bodies and the like, the combination of a feeding conveyor having a plurality of feed dogs carried in spaced relation thereon for propelling container bodies in endwise relation and in a continuous procession along a predetermined path of travel, an endless chain upending conveyor disposed adjacent the path of travel of said feeding conveyor for engaging the trailing ends of container bodies carried by the feeding conveyor, actuating means for moving said upending conveyor in time with said feeding conveyor, and a fixed support spaced from said feeding conveyor for receiving said upended bodies and for restraining their further advancement until picked up by a feed dog of said feeding conveyor for maintaining the upended bodies in properly timed relation.

7. In a conveyor mechanism for articles such as container bodies and the like, the combination of a feeding conveyor having a plurality of feed dogs carried in spaced relation thereon for propelling container bodies in endwise relation and in a continuous procession along a predetermined path of travel, an endless chain upending conveyor disposed adjacent the path of travel of said feeding conveyor for engaging the trailing ends of container bodies carried by said feeding conveyor and for pivotally turning said bodies about their forward ends into upended position, actuating means for moving said upending conveyor in time with said feeding conveyor, and a stationary table disposed adjacent said feeding conveyor for receiving said upended bodies from said feeding conveyor and for restraining its advancement until picked up by a following dog of said feeding conveyor to maintain the upended container bodies in properly timed advancing relation.

8. In a conveyor mechanism for articles such as container bodies and the like, the combination of a feeding conveyor, a plurality of feed dogs carried on said conveyor in spaced relation for propelling container bodies in endwise relation and in a continuous procession along a predetermined path of travel, an endless chain upending conveyor disposed adjacent the path of travel of said feeding conveyor, actuating means for moving said upending conveyor in time with said feeding conveyor, an upending finger carried on said upending conveyor and engageable with a moving body adjacent an end thereof for pivoting the body adjacent its opposite end into an upright position on said conveyor, and means for changing the position of said upending conveyor relative to said feeding conveyor for accommodating bodies of different heights.

9. In a conveyor mechanism for articles such as container bodies and the like, the combination of a feeding conveyor, a feed dog carried on said conveyor for propelling a container body along a predetermined path of travel, means movable adjacent the path of travel of said conveyor for engaging the moving container body to turn the body into an upright position on said conveyor, means for changing the position of said engaging means relative to said feeding conveyor for accommodating bodies of different heights, and indicating means disposed adjacent said engaging means for visibly indicating the position of said engaging means for facilitating change of position thereof.

10. In a conveyor mechanism for articles such as container bodies and the like, the combination of a feeding conveyor, a plurality of feed dogs carried on said conveyor in spaced relation for propelling container bodies in endwise relation and in a continuous procession along a predetermined path of travel, an endless chain upending conveyor disposed adjacent the path of travel of said feeding conveyor, actuating means for moving said upending conveyor in time with said feeding conveyor, a pivotable mounting for said upending conveyor, an upending finger carried on said upending conveyor and engageable with a moving body adjacent an end thereof for pivoting the body adjacent its opposite end into an upright position on said feeding conveyor, means for pivoting said mounting for changing the position of said upending conveyor relative to said feeding conveyor for accommodating bodies of different heights, and indicating means connected to said mounting for visibly indicating the position of said mounting for facilitating change of position thereof.

FRANK F. BORKMANN.

REFERENCES CITED

The following references are of record in the file of this patent:

UNITED STATES PATENTS

| Number | Name | Date |
| --- | --- | --- |
| 1,859,486 | Aimes | May 24, 1932 |